Aug. 25, 1925.
B. W. JONES
1,551,400
MOTOR CONTROL SYSTEM
Filed April 12, 1924
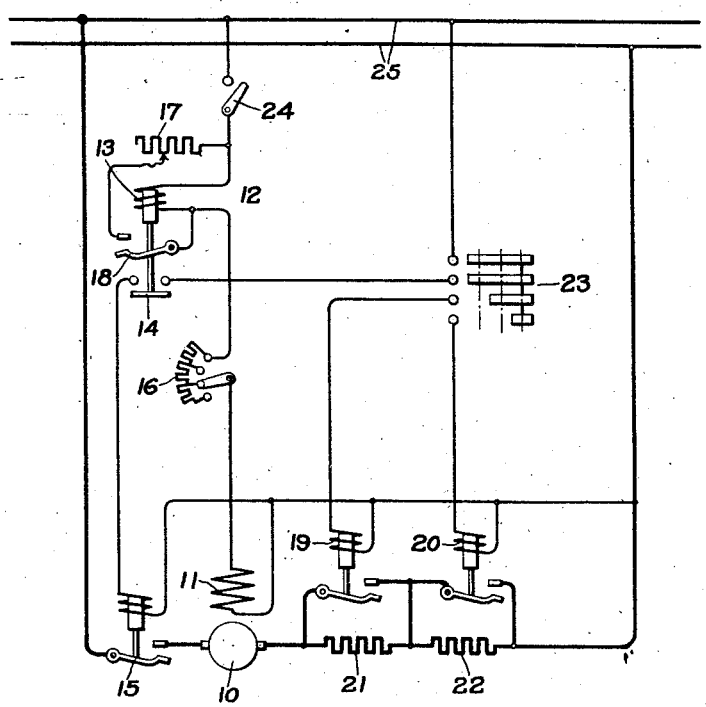
Inventor:
Benjamin W. Jones,
by Alexander S. Lentz
His Attorney.

Patented Aug. 25, 1925.

1,551,400

UNITED STATES PATENT OFFICE.

BENJAMIN W. JONES, OF SCHENECTADY, NEW YORK, ASSIGNOR TO GENERAL ELECTRIC COMPANY, A CORPORATION OF NEW YORK.

MOTOR-CONTROL SYSTEM.

Application filed April 12, 1924. Serial No. 706,189.

*To all whom it may concern:*

Be it known that I, BENJAMIN W. JONES, a citizen of the United States, residing at Schenectady, in the county of Schenectady, State of New York, have invented certain new and useful Improvements in Motor-Control Systems, of which the following is a specification.

My invention relates to systems of motor control, and particularly to the control of motors having shunt field windings. One of the objects of the invention is to provide an improved arrangement whereby the motor armature is prevented from being connected to a source of supply unless the shunt field winding is energized and to effect the automatic disconnection of the motor armature from the source of supply in case the energization of the field winding is dangerously reduced or in case of failure of the source of supply.

The speed adjustment of an adjustable speed motor which is obtained by varying the energization of the shunt field winding, will sometimes be of such a range that the shunt field will take as much as eight times the value of current for the full field or low speed condition as for the reduced field or high speed condition. It is desirable to provide some protection whereby the motor armature will not be connected to the source of supply unless the field winding is energized and whereby in case the circuit of the shunt field winding is either opened or abnormally weakened, the motor armature will be automatically disconnected from the supply circuit.

An electromagnetic field protective device which is designed so as to take care of the lowest operating value of the field current so as to effect the automatic disconnection of the motor armature from the source when the field is abnormally weakened or the source of supply fails, would be heated to an excessive degree when the full field adjustment of the motor is made, provided the ordinary type of field protective device is used. An electromagnetic field protective switch which will close under conditions of weakened field of the motor and not overheat when the maximum current adjustment of the motor field winding is made, would require a device which under ordinary conditions may be required to operate on approximately 1/60 of the energy that it must dissipate under full field conditions.

One of the objects of my invention is to provide a simple and effective arrangement whereby the electromagnetic field protective device shall be capable of standing the maximum field current condition without injurious effects and which will, at the same time, give an accurate control of the motor to protect the motor under conditions of abnormally weakened field current or failure of power.

In carrying my invention into effect, I provide an improved arrangement whereby an electromagnetic field protective device in the form of an electromagnetic switch may be designed so as to open under weakened field conditions without any regard to the current through the field winding when the full field condition of the motor is established. In order to take care of the heating effect of the full field condition, the coil of the field protective switch is shunted by a resistor when the switch closes. By reason of the fact that the coil of the field protective switch is shunted by a resistor when the switch closes, the switch winding is required to carry the full field current only momentarily when the field of the motor is adjusted for the full field condition, and furthermore, the adjustment of the resistance of the shunt path to the field protective switch provides a very simple and effective arrangement whereby the value of current at which the switch is intended to operate so as to automatically disconnect the motor armature from the source of supply may be very nicely adjusted.

For a better understanding of the invention, reference is had to the accompanying drawing, wherein the electric motor provided with an armature 10 and a shunt field 11 is automatically protected by means of the field protective device 12, which is designated on the drawing as an electromagnetic relay having a winding 13 in series relation with the shunt field of the motor and a switch member 14 which controls the line contactor 15 included in the armature circuit of the motor. The rheostat 16 is included in the shunt field circuit of the motor for the purpose of adjusting the motor speed. The adjustable resistor 17 is arranged so as to be connected in shunt to the winding 13 of the relay 12 when the relay closes by means of the auxiliary switch member 18 for the purpose of preventing excessive heating of the relay winding under full field conditions and for other purposes, as will be explained fully hereinafter. The resistor contactors 19 and 20 are provided for controlling the sections of the starting resistor 21 and 22, respectively, under the control of the master switch 23 for the purpose of controlling the acceleration of the motor during the starting interval. As thus constructed and arranged and with the parts in their respective positions, as shown in the drawing, the operation of my invention is as follows:

The manually operated switch 24 included in the shunt field circuit of the motor will first be closed, thereby energizing the shunt field of the motor through a circuit which includes the coil 13 of the relay 12 and the speed adjusting rheostat 16. Because of the fact that the full value of current through the shunt field of the motor passes through the coil 13 of the relay, the relay winding will be very strongly energized momentarily and the relay will close with a very strong action. The circuit for the coil of the line contactor 15 is partially completed through the switch member 14 of the relay 12 and the adjustable resistor 17 is connected in shunt to the relay winding by the operation of the relay switch member 18. It will be observed that the full value of the field current is employed to effect the closing of the field protective relay and that after the relay closes, the relay winding is protected from excessive heating by reason of the fact that the resistor 17 establishes a shunt path through which a portion of the field current passes. In order to connect the motor armature to the source of supply and to accelerate the motor during the starting interval, the master switch 23 is moved through its successive operative positions, first closing the line contactor 15 and then closing the resistor contactors 19 and 20 successively. If it is desired to increase the speed of the motor, the field rheostat 16 will be moved so as to include more of the resistance thereof in the shunt field circuit of the motor; in case it is desired to decrease the speed of the motor, the field rheostat will be moved so as to decrease the value of the resistance thereof. In case the shunt field circuit of the motor should become grounded, or in case the supply circuit 25 should fail, the energization of the field protective relay 12 will be decreased to such a value that the relay will automatically open, thereby opening the switch 14 and thus effecting the automatic opening of the line contactor 15. When the relay 12 opens, it also opens the shunt path to the relay winding.

It will be observed that with my arrangement, although the full value of the field current of the motor is used for effecting the closing of the field protective relay, this relay is not required to thereafter withstand this full field current, but is merely required to withstand a very much reduced value of current. The relay winding is thus prevented from becoming overheated. Furthermore, by adjusting the value of the shunting resistor 17, the value of the current at which the relay automatically opens may be very nicely and accurately adjusted. By reason of this fact, the relay may be employed for the protection of a great variety of electric motors in which the normal range of values of the shunt field current varies greatly. It is to be noted also that by reason of the fact that the resistor is included in shunt relation with the relay winding, the effect of the resistor in determining the value of current in the shunt field winding is negligible since the resistance of the field winding and the rheostat 16 will ordinarily be very high as compared to the resistance of the winding of the relay.

What I claim as new and desire to secure by Letters Patent of the United States is as follows:

1. The combination with an electric motor having a shunt field winding, of a line contactor for connecting the motor armature to a source of supply, an electromagnetic relay energized responsively to the current in the said field winding for controlling the said contactor, and means for establishing a shunt about the winding of said relay when the relay closes to prevent overheating of the relay winding.

2. The combination with an electric motor having a shunt field winding, a rheostat for varying the energization of said field winding to vary the motor speed, of an electromagnetic switch having a winding in series relation with the said field winding for preventing the connection of the motor armature to a source of supply unless the said field winding is energized and for effecting the automatic disconnection of the motor armature from the source of supply upon failure of said source, and means for automatically shunting the winding of said switch when the switch closes to permit the switch to close with the full value of the current in the said field winding through the switch winding and to prevent excessive heating of the switch winding when the switch closes.

3. The combination with an electric motor having a shunt field winding, a rheostat for varying the energization of said field winding to vary the motor speed, of an electromagnetic switch having a winding in series relation with the said field winding and a switch member for effecting the automatic disconnection of the motor armature from the source of supply upon failure of said source, a variable resistor, and an auxiliary switch member of said switch for connecting the said resistor in shunt to the said switch winding when the switch closes for preventing overheating of the switch winding.

In witness whereof, I have hereunto set my hand this 11th day of April, 1924.

BENJAMIN W. JONES.